United States Patent [19]

Frey et al.

[11] Patent Number: 5,651,811
[45] Date of Patent: Jul. 29, 1997

[54] FILTER SYSTEM

[75] Inventors: Robert A. Frey, Westlake; Philip H. Stevenson, Cleveland, both of Ohio

[73] Assignee: HMI Industries, Inc., Cleveland, Ohio

[21] Appl. No.: 632,111

[22] Filed: Apr. 15, 1996

Related U.S. Application Data

[62] Division of Ser. No. 382,784, Feb. 2, 1995, Pat. No. 5,593,479.

[51] Int. Cl.$^6$ ............................................. B03C 3/155
[52] U.S. Cl. ........................... 96/69; 55/528; 55/DIG. 39
[58] Field of Search ................................. 96/57–63, 17, 96/55, 65–68, 59, 69; 55/528, DIG. 39, 485, 486; 95/63, 69, 70; 15/347, 353; 428/286

[56] References Cited

U.S. PATENT DOCUMENTS

| | | | |
|---|---|---|---|
| 2,627,936 | 2/1953 | Martinet | 55/471 |
| 2,627,937 | 2/1953 | Martinet | 55/372 |
| 3,343,344 | 9/1967 | Fairaizl et al. | 55/376 |
| 3,500,517 | 3/1970 | Dekker et al. | 264/147 X |
| 3,608,024 | 9/1971 | Yazawa | 264/103 |
| 3,870,495 | 3/1975 | Dixson et al. | 55/489 |
| 3,966,597 | 6/1976 | Omori et al. | 264/51 X |
| 3,998,916 | 12/1976 | Turnhout | 264/436 |
| 4,365,980 | 12/1982 | Culbert et al. | 55/315 |
| 4,374,888 | 2/1983 | Bornslaeger | 428/286 X |
| 4,504,290 | 3/1985 | Pontius | 55/486 X |
| 4,650,505 | 3/1987 | Magdelain | 55/467 X |
| 4,702,753 | 10/1987 | Kowalczyk | 55/267 |
| 4,874,659 | 10/1989 | Ando et al. | 55/528 X |
| 4,886,527 | 12/1989 | Fottinger et al. | 55/DIG. 39 |
| 4,902,306 | 2/1990 | Burnett et al. | 55/528 X |
| 4,904,343 | 2/1990 | Giglia et al. | 55/528 X |
| 4,909,815 | 3/1990 | Meyer | 55/356 X |
| 4,917,942 | 4/1990 | Winters | 55/DIG. 39 |
| 5,037,455 | 8/1991 | Scheineson et al. | 55/528 X |
| 5,108,470 | 4/1992 | Pick | 96/58 |
| 5,112,677 | 5/1992 | Tani et al. | 55/DIG. 39 |
| 5,221,573 | 6/1993 | Baaigas, Jr. | 55/DIG. 39 |
| 5,248,323 | 9/1993 | Stevenson | 55/528 X |
| 5,306,534 | 4/1994 | Bosses | 15/347 X |
| 5,350,443 | 9/1994 | von Blucher et al. | 55/DIG. 39 |
| 5,350,620 | 9/1994 | Sundet et al. | 55/DIG. 39 |

FOREIGN PATENT DOCUMENTS

| | | | |
|---|---|---|---|
| 4240172 | 6/1994 | Germany | 15/347 |

OTHER PUBLICATIONS

* References Were Cited In Parent Case SN 08/382,784.
43M, page ad by 3M, 1990 "Some of Our Best Ideas are Collecting Dust".

*Primary Examiner*—Richard L. Chiesa
*Attorney, Agent, or Firm*—Vickers, Daniels & Young

[57] ABSTRACT

A vacuum cleaner having a reduced velocity chamber with a high velocity air inlet, an electric motor, a rotary mechanism driven by the motor for creating a vacuum in the chamber, an outlet for exhausting air from the chamber, which air flows in a selected path from the air inlet, through the chamber and out the air exhaust outlet and a disposable porous sheet filter layer in the chamber for removing solids particles from the air. The vacuum cleaner also has a fiber filter between the filter layer and the motor where the fiber filter has an electrically charged non-woven material for removing very fine air particles in the chamber, intersecting the air path and generally coterminous with the disposable filter layer.

33 Claims, 4 Drawing Sheets

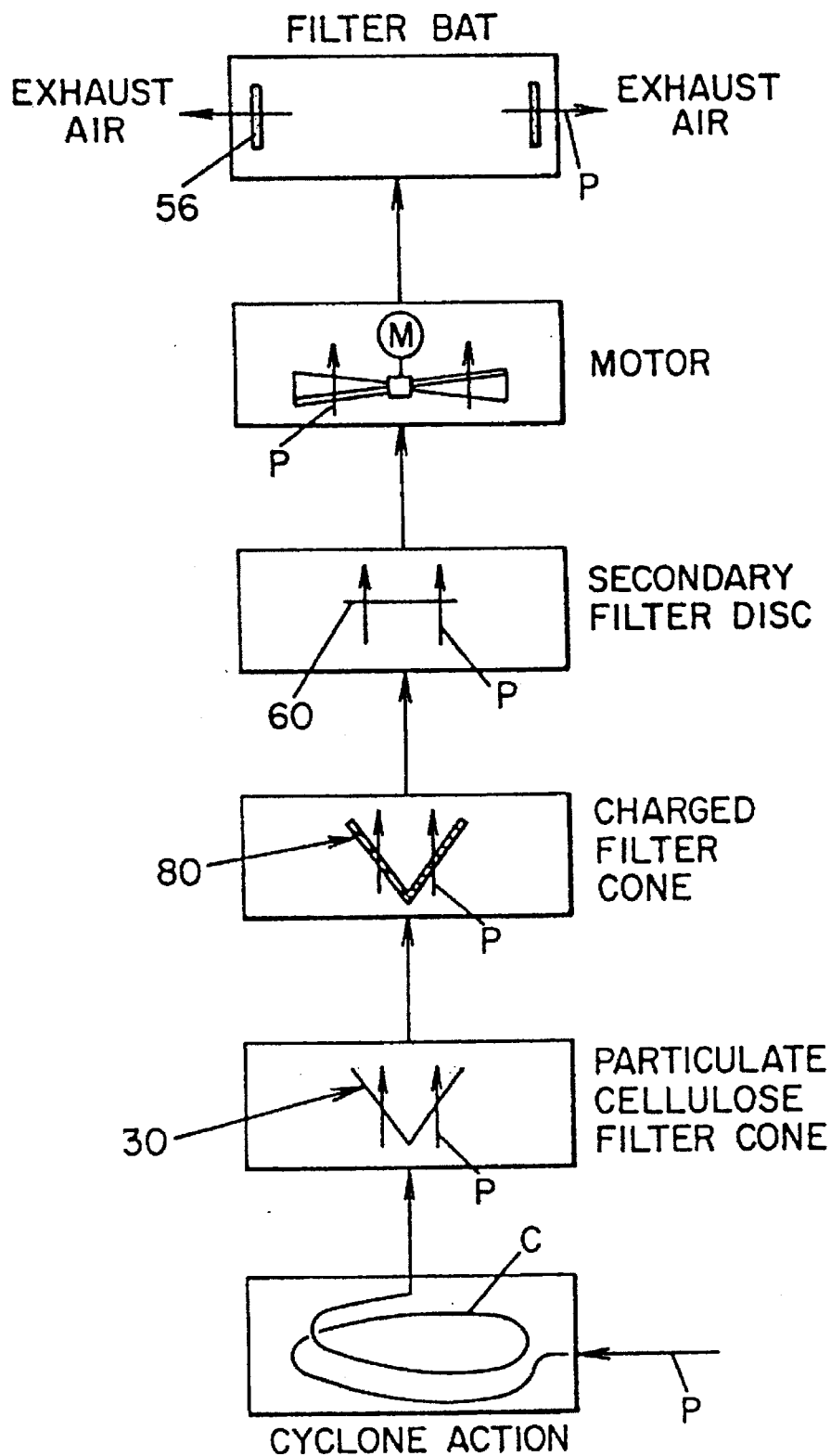

FILTER SYSTEM

This invention is a division of application Ser. No. 08/382,784, filed Feb. 2, 1995, now U.S. Pat. No. 5,593,479 issued Jan. 14, 1997.

The present invention relates to the art of air filter systems and more particularly to an improved vacuum cleaner employing a novel filter element.

The invention is particularly applicable for a canister type vacuum cleaner and it will be described with particular reference thereto; however, the invention has much broader applications and may be used to filter air by employing the novel filter element and filtering method as contemplated by the present invention.

INCORPORATION BY REFERENCE

Martinec U.S. Pat. Nos. 2,627,936 and 2,627,937, issued in 1953, are incorporated herein as background information regarding the type of vacuum cleaner to which the present invention is particularly applicable. In addition, U.S. Pat. Nos. 3,343,344 and 5,248,323 are incorporated by reference herein to illustrate a canister type vacuum cleaner with a low velocity receptacle or chamber into which is placed a conical filter sheet formed from non-woven cellulose fiber and over a downwardly extending support structure for the purpose of removing particulate material from the air being processed through the vacuum cleaner. The rigid perforated conical support structure or member holds the filter sheet in its conical configuration. The support member and filter sheet or filter element are mounted together with the layer covering the rigid support member. Within the conical support member there is provided a generally flat disc shaped cellulose filter sheet for further removal of particulate solids as the solids pass with the air from the canister through the conical filter sheet and through the disc to the outlet or exhaust of the vacuum cleaner. The third and fourth patent are incorporated by reference herein to preclude the necessity of repeating structural details not generally related to the inventive aspect of the present invention.

BACKGROUND OF INVENTION

A canister type vacuum cleaner is illustrated in the patents incorporated by reference herein and includes a reduced velocity chamber with a high velocity air inlet. Air is drawn into the chamber by an electric motor which drives a rotary means, or fan, for creating vacuum in the chamber to draw air laden with particulate material through the chamber and force it from the outlet as exhausted clean air. Canister type vacuum cleaners normally include a conical filter extending downwardly into the canister or low velocity chamber and formed of a porous mat to remove the dirt and debris carried by the air coming into the canister. The high velocity air drawn into the chamber has a tendency to entrain large solid particles which are brought into the low velocity chamber where the air is then swirled or vortexed in a centrifuge configuration with convolutions so that large particles carried into the chamber with the inlet air are extracted by the vortexed or cyclonic action of the air in the canister. Thereafter, the air is pulled upwardly through the conical filter mat or porous layer toward an upper motor that drives a fan for creating a vacuum in the canister, or reduced velocity chamber, so that the air flowing upwardly through the conical filter passes through a filter disc and outwardly through an exhaust passage, or passages, above the canister. Stevenson U.S. Pat. No. 5,248,323 developed an improvement to filters for vacuum cleaners by developing an activated charcoal containing filter which efficiently remove gaseous impurities, such as paint fumes and other odor creating gases which are in the air and pass through the vacuum cleaner.

The canister type vacuum cleaner, as so far described, only removes the relatively large particles entrained in the air. Air particles of a size less than 10 microns pass freely through the filter medium and are recirculated in the room. Many of these small particles can act as irritants to an individual and the recirculation of such particles can increase the irritation to an individual. High density filters must be employed to filter out very small particles in the air; however, high density filters cause large pressure drops through the filter thus cannot be used in standard vacuum cleaners or other air filtering systems.

In summary, vacuum cleaners, in general, canister type vacuum cleaners, in specific, have not been able to remove very small particles entrained in the air.

THE INVENTION

The present invention relates to an improved vacuum cleaner with a novel filtering arrangement which allows a vacuum cleaner, and more particularly a canister type vacuum cleaner, to be modified for the purpose of handling a wide variety of particles entrained in the air being drawn through the vacuum cleaner by an electric motor. Thus, the vacuum cleaner can be an environmental air cleaning device as well as a standard vacuum cleaner.

In accordance with the present invention, there is provided an improvement in a vacuum cleaner of the type comprising a reduced velocity chamber with a high velocity air inlet, an electric motor, a rotary means driven by the motor for creating a vacuum in the chamber, an outlet for exhausting air from the chamber, which air flows in a selected path from the air inlet, to the low velocity chamber, and out the air exhaust outlet or outlets and a disposable filter layer in the chamber for removing solid particles from the air, which filter layer intersects the air path. The improvement in this type of vacuum cleaner is the provision of a changeable filter layer which includes a fiber material which removes all sizes of particles including particles of less than ten microns in size. In this manner, the filter removes all sizes of particles entrained in the air to provide a significantly cleaner environment. Standard filter mediums filter out approximately 300,000 particles out of 20 million particles which flow into the filter medium. Particles which are ten microns or less in size pass freely through standard filter medium. Such particles include pollen, dust mites, bacteria, viruses, etc. The recirculation of these small particles can spread diseases and/or cause allergic reactions. The improved filter layer of the present invention includes a special fiber material which removes all sizes of particles which result in about a 19 million particle removal out of 20 million particles which pass into the improved filter layer. As a result, over 99.9% of the particles greater than 2 microns in size and over 70% of the particles 0.3–2.0 microns in size are filtered out of the air passing through the improved filter layer. The fiber material of the improved filter layer includes electrically charged, fibrous material. The filter layer uses a combination of electrostatics and mechanical capture mechanisms to remove particles entrained in the air.

In accordance with another feature of the present invention, the improved filter layer does not cause a large pressure drop as the air passes through the improved filter layer. The electrically charged fibers attract particles when passing through the filter. The attraction of the particles allows the filter to be made more porous thereby reducing the pressure drop through the filter. The relatively low pressure drop through the improved filter layer enables the filter layer to be used in vacuum cleaners, such as canister type vacuum cleaners or for various other types of air filter systems.

In accordance with still another feature of the present invention, the improved filter layer includes three layers of the electrically charged fiber material, each layer having a weight of 60–150 gm/m$^2$. Three layers of the fiber material are the optimum number of layers for filtration efficiency verses pressure drop through the fiber layers.

In accordance with yet another aspect of the present invention, a support material is used in combination with the fiber material to support and hold the fiber material in position during the filtration of the air. The support material is preferably a woven material such as cotton, nylon, polyester or the like. The woven material is a stronger material than the non-woven fiber material. The woven material is a very porous material so that there is essentially negligibly pressure drop as the air passes through the support material. Preferably, the support material makes up the inner and outer layer for the improved filter thereby enclosing the fiber material between the support material.

In accordance with another aspect of the present invention, the layers of the filter are connected together by a seal produced by an ultrasonic welder. An ultrasonic welder heats the layers thereby melting the layers together to form a seam which holds the layers together. Alternatively to or in connection with an ultrasonic seal, a seal can be formed by glue, stitching, stapling or the like.

In accordance with still another aspect of the present invention, a disposable filter is used in conjunction with the improved filter to filter out large particles entrained in the air prior to the air entering the improved filter. The use of a disposable filter for filtering larger particles from the air prior to the air entering the improved fiber filter enhances the life of the improved fiber filter. The disposable filter can be a paper of cellulose type filter. The disposable filter is generally coterminous to the improved fiber filter.

In accordance with yet still another aspect of the present invention, a gas removing filter is used in combination with the improved fiber filter to remove gases such as smoke, fumes, gas contaminants, noxious gaseous substances and the like from the air. The gas filter is generally coterminous to the improved fiber filter. The gas removing filter is preferably formed into a conical layer of non-woven activated charcoal matting. The conical gas removing filter includes a layer of activated charcoal material in the form of a non-woven mat impregnated with activated carbon. The mat has a thickness of less than about ½ inch and is preferably a conical mat structure wherein the layer of activated charcoal filtering material is approximately ¼ inch in thickness. Preferably, the mat is a non-woven polyester material impregnated with activated carbon. The gas filter has a normally sponge texture to create more surface area for the active carbon. Preferably the activated charcoal is ¼ inch matting sold by Lewcott Corporation as Part No. ACF-NWPE-4.0-150.

In accordance with another aspect of the present invention, both the improved fiber filter layer and disposable filter are conical in shape to maximize the surface area to provide increased particle removal. Consequently, all the filters are sandwiched together thereby minimizing the area taken by the filters and to ensure the filters are in the proper position in the vacuum cleaner. This construction allows the use of the filter layers to be easily adapted for use in a standard canister type vacuum cleaner without modification of the vacuum cleaner.

The primary object of the present invention is the provision of a novel filter element that can effectively filter out a majority of the particles entrained in the air without causing a large pressure drop and can be easily used in a vacuum cleaner such as a canister type vacuum cleaner.

Another object of the present invention is the provision that the novel filter includes non-woven electrically charged fibers which attract particles as the particles pass into the filter.

Another object of the present invention is the provision of a filter element as described above, which filter element can be changed easily and can be used in a standard canister type vacuum cleaner without modification of existing vacuum cleaner structure.

Yet another object of the present invention is the provision of a filter element, as defined above, which filter element has a large area to which the air flowing from the canister toward the exhaust outlet of the vacuum cleaner has a relatively large area compared to a standard circular disc shaped filter element.

Yet another object of the present invention is the provision of a conical fiber filter element adapted to be sandwiched within and held in nested position with a standard conical filter element of a canister type vacuum cleaner.

Still a further object of the present invention is the provision of a conical filter element, of the type defined above, which filter element is fixedly located in the reduced air velocity chamber or area of a vacuum cleaner so that low velocity air passes through the novel filter element to allow resident time to contact the large surface area of the loose mat to remove particles from the air being cleaned by the vacuum cleaner.

Still a further object of the present invention is the provision of using the fiber filter element in combination with a gas removing filter so as to allow the standard canister type vacuum cleaner to be used as an air cleaner to remove all sizes of air particles, smoke, paint fumes, and other deleterious gaseous substances from ambient air within a closed room or area.

In accordance with another objective of the present invention, the improved fiber filter and disposable filter and/or carbon filter are nested together and supported by a support structure.

These and other objects and advantages will become apparent from the following description taken together with the accompanying drawings.

BRIEF DESCRIPTION OF THE DRAWINGS

FIG. 9 is a block diagram showing the filtering and operating steps of a canister type vacuum cleaner improved by incorporating the novel filtering element of the present invention.

DESCRIPTION OF THE PREFERRED EMBODIMENT

Figure 1:
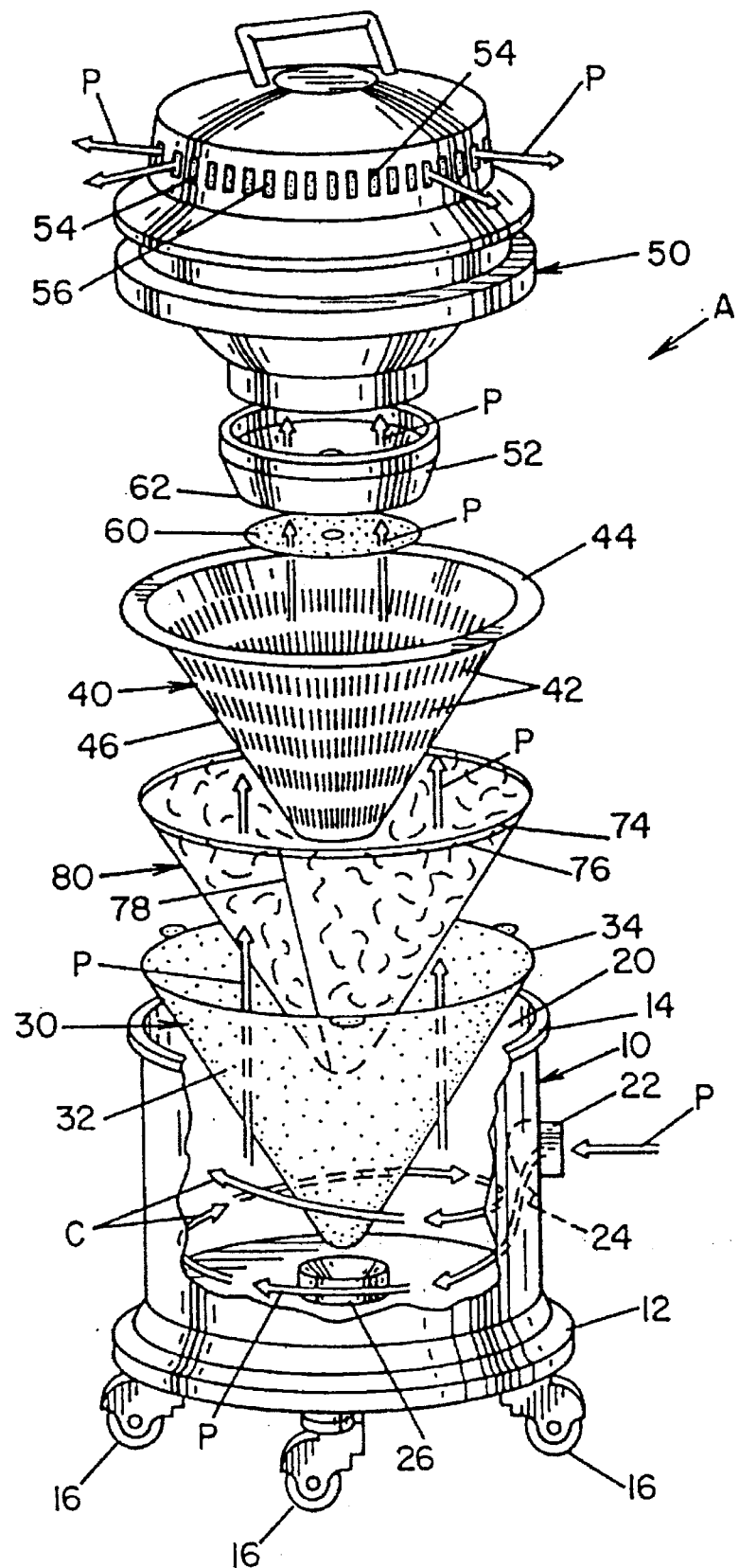
FIG. 1 is a pictorial exploded view of a standard canister type vacuum cleaner employing the novel filter element of the present invention.
Figure 2:
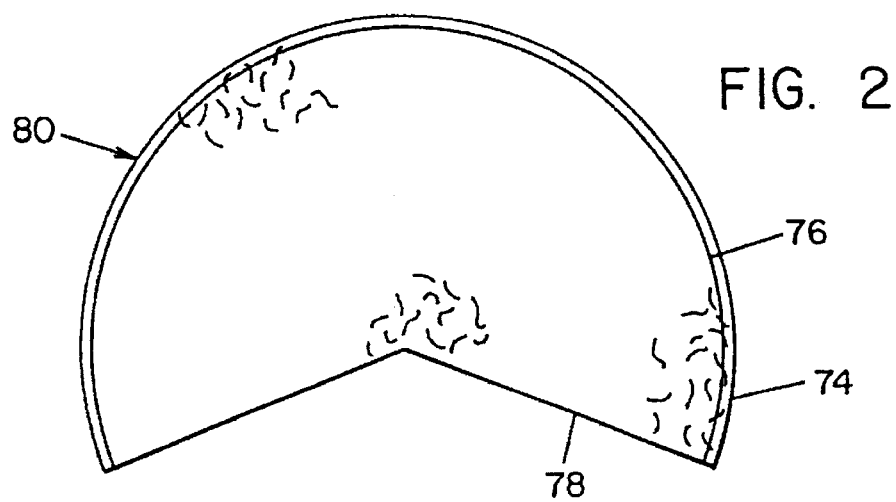
FIG. 2 is a top view of a flat blank of the novel filter cut into a shape for subsequent forming into the preferred embodiment of the present invention.
Figure 5:
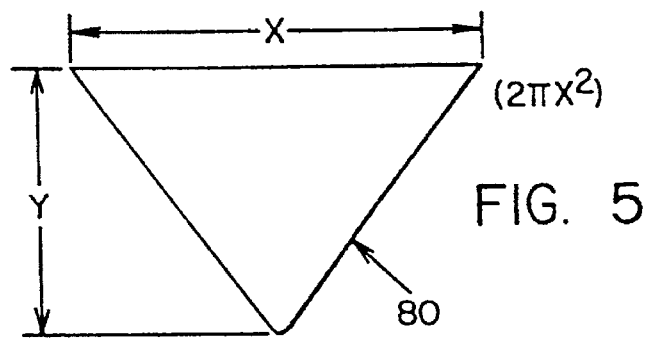
FIG. 5 is a side elevational view showing the geometric configuration of the preferred embodiment of the present invention illustrated in FIGS. 2 and 3.

Referring now to the drawings wherein the showings are for the purpose of illustrating a preferred embodiment of the invention only and not for the purpose of limiting same, FIG. 1 shows a canister type vacuum cleaner A having a lower generally cylindrical canister 10 with a base 12 and an upper circular opening defined by rim 14. In the illustrated embodiment, a plurality of circumferentially spaced wheels 16 support canister 10 for movement along the floor of a room being cleaned. Canister 10 includes a low velocity chamber 20 with a high velocity inlet 22, an air deflector 24 and a lower filter rest 26. Air flow through the vacuum cleaner is illustrated as arrows defining a path P. In chamber 20 of canister 10, path P is in the form of a vortexed or cyclone portion C of several convolutions so that particles carried by air through chamber 20 are removed by centrifugal force and are retained in the low velocity chamber 20. Thereafter, air flow path P is generally in an upwardly vertical direction so that the air being cleaned moves through a conical filter element, or layer, 30 formed from a flat, non-woven cellulose fiber with an outer conical surface 32 and an upper circular opening 34. The diameter of open end 34 is X and the height of a conical filter 30 is Y, as shown in FIG. 5. In this manner, a substantially increased amount of filtering surface is obtained through use of a conical surface. Otherwise, filtering would be through a circular area defined by the diameter of open end 34. Filter layer 30 is relatively thin since it includes small interstices to physically block the passage of solid particles. Filter layer 30 is a standard vacuum cleaner filter designed to act as a barrier to relatively large particles entrained in the air. Filter layer 30 removes approximately 300,000 out of 20 million from the air as the air passes through filter 30. Very small particles pass freely through filter layer 30. Such filtration efficiency meets standard EPC guidelines.

To retain the conical shape of the relatively unstable conical element 30, there is provided a filter support 40 having a large number of perforations 42 and an upper circular rim 44. When assembled, conical support 40 nests within thin, conical filter layer 30 and rim 44 clamps the filter layer against rim 14 of canister 10. The outer conical surface 46 bears against the inner conical surface of filter layer or element 30 in normal practice to support this conical filter element. As so far described, air passes through the thin, non-woven conical cellulose layer or filter element 30 through perforations 42 and upwardly in a direction defined by air path P.

In accordance with standard practice, a motor driven fan housing 50, of the type shown in the prior art, includes a lower inlet 52 and an air exhaust shown as a large number of peripherally spaced outlet exhaust openings 54 having a common cylindrical secondary filter 56 for removal of any solid particles reaching housing 50. Secondary filter disc 60 is before motor 50 and is supported by a flat perforated support disc 62. As so far described, canister vacuum cleaner A is constructed in accordance with standard practice.

In accordance with the invention, there is provided a novel, fiber layer 70 formed from electrically charged electret, fibrous material. The fibrous material is preferably a high molecular weight, non-polar substance which is electrically charged and formed into a fiber filter layer 70. One such high molecular weight, non-polar substance is polypropylene. Fiber layer 70 is a non-woven layer of crimpable fiber material formed into a filter layer. The polypropylene fibers resist growth of mold, mildew, fungus or bacteria. The fibers also resist degradation over time and are able to withstand extremes in temperatures and humidity—up to 70° C. (158° F.) and 100% relative humidity. Therefore, the fibers are unaffected by normal operating temperatures and water in the air. As a result, the filter can be used in both wet and dry environments and clean liquid spills. The charged fiber layer filters the air particles by both a mechanical and an electrostatic mechanism. As the entrained air particles pass into fiber layer 70, the fiber layer acts as a mechanical barrier to prevent air particles from penetrating the fiber layer. Further, the electrically charged fibers attract the air particles to the fibers to significantly enhance the air filtering efficiency of the fiber layer. The fiber layer 70 is preferably a non-woven layer electrically charged polypropylene. The fiber layer has been found to remove essentially all particles having a size greater than two microns. The fiber layer has a 99.9% air filtration efficiency for particles greater than two microns in size. For particles from 0.3–2.0 microns, the fiber layer has a filtration efficiency of at least 70%. As a result, out of 20 million air particles entering the fiber layer, over 19 million are filtered out of the air. Never before has there been a dry filtration arrangement suitable for vacuum cleaners which could filter out very fine particles such as dust mites, pollen, bacterial, viruses or the like from the air. The weight of fiber layer 70 is preferably 60–150 gm/m$^2$ which results in a very nominal pressure drop as the air passes through the fiber layer. Preferably, filter layer 70 has a ASHRAE 52.1. Initial Atmosphere Dust Spot Efficiency @40 ft/min of at least 80. A preferred fiber material of the present invention may be formed from an air filter media commercially available at 3M FILTRETE® brand air filter media SBMF-40.

Figure 6:
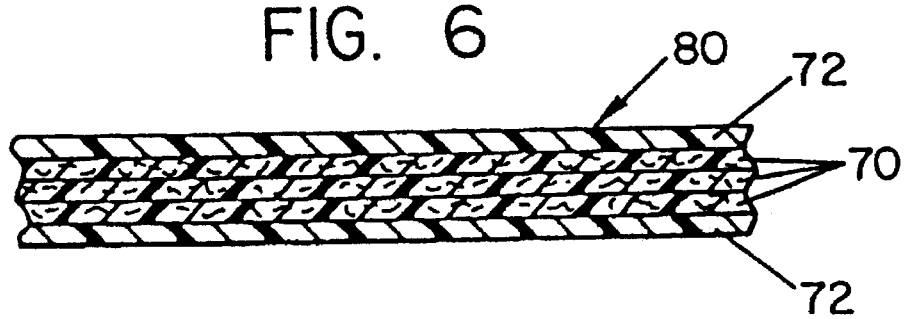
FIG. 6 is a cross-sectional view of the novel filter having three layers of fiber material enclosed in a support material.
Figure 7:
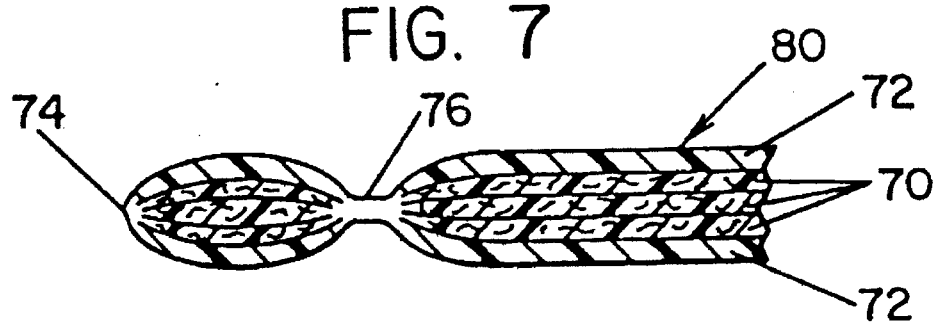
FIG. 7 is a cross-sectional view of the novel filter showing the sealing together of the layers of the filter.
Figure 8:
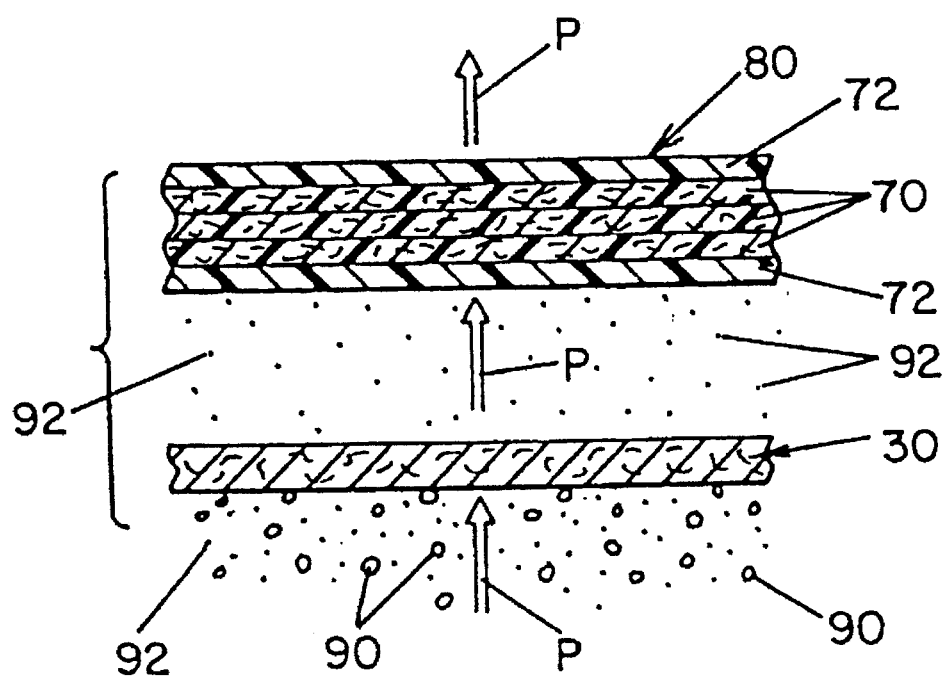
FIG. 8 is a schematic layout view of the air flow through a two filter system.

FIGS. 6, 7, and 8 illustrate a filter blank 80 which includes three fiber layers 70 enclosed between a support material 72. Three layers of fiber material have been found to optimize the air filtration efficiency verses pressure drop through the filter blank. Increasing the number of fiber layers above three increases the particle filtration efficiency, but significantly increases the pressure drop through filter blank 80 thereby rendering the filter blank unusable in many types of vacuum cleaners. Decreasing the number of fiber layers below three slightly decreases the pressure drop through filter blank but results in a significant reduction of particle filtration efficiency. Three layers of fiber material wherein each layer has a weight of 60–150 gm/m$^2$ provides for particle removal efficiencies above 90% for particle 2.0 microns or greater in size and results in an acceptable pressure drop through the layers for use is standard vacuum cleaner systems.

Support material 72 is an air-transmissive layer which impart almost zero pressure drop as the air passes through the support material. Support material 72 is preferably a woven sheet of polyester, nylon or the like. The support material is not electrically treated and is used essentially to support and maintain the fiber layers in position during the vacuum cleaning cycles. The fiber layers 70 have little tensile strength and can be damaged during the vacuum cleaning cycle. The support material protects the fiber layers from damage and retains the fiber layers in proper position during air filtration. Additional support layers, which are not shown, can be interposed between one or more fiber layers to add additional structural support to filter blank 80.

Figure 3:
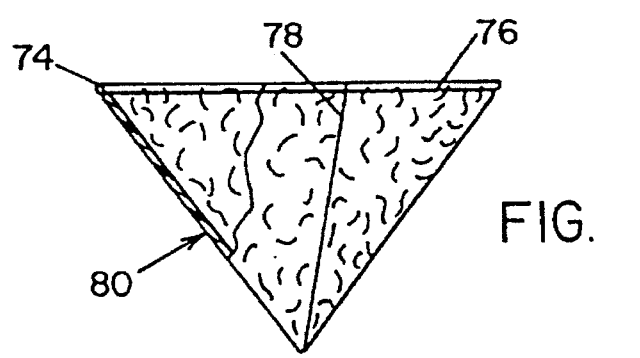
FIG. 3 is a side view of the mat shown in FIG. 2 formed into a conical element and showing the cross-section of the filter element partially.
Figure 4:
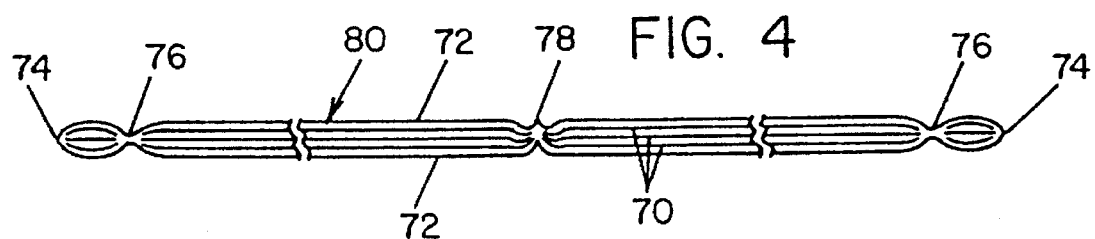
FIG. 4 is a cross-sectional view of the flat blank of FIG. 2.

The multiple layers of filter blank 80 are connected together at the edge of the blank by melting the layers together. FIGS. 4 and 7 illustrate that the outer edge 74 of blank 80 melted together. Blank 80 also includes a second melted area 76 spaced slightly inward from edge 74. The second melted area 76 ensures that blank 80 is properly sealed and all the layers of blank 80 are adequately connected together. The melted regions are preferably formed by an ultrasonic welder. The ultrasonic welder heats the fiber layers and support layers to a temperature which melts the layers together to form the melted regions. In FIG. 4, inner seam 78 is also melted together by an ultrasonic welder to form the conical blank illustrated in FIG. 3.

The formed conical filter blank 80 preferably nests within conical filter element or layer 30 and is sandwiched between this thin filter layer and filter support 40. As illustrated in FIG. 8, layer 30 acts as a mechanical barrier to prevent large particles 90 from entering into filer blank 80. The small particles 92 which penetrate the small openings in layer 30 are subsequently filtered out of the air by fiber layer 70 in filter blank 80. The use of layer 30 extends the life of filter blank 80 by filtering out the larger particles which can clog up the air passages in filter blank 80.

A gas filter, not shown, may also be used with filter layer 30 and filter blank 80 to remove undesirable gases from the air. The gas filter is preferably conical in shape, rigidified and nested between filter blank 80 and filter support 40. The gas filter includes activated charcoal impregnated in a blank of spongy, flat, non-woven polyester mat material. The gas filter is less than ½ inch thick, preferably about ¼ inch thick, and causes a minimal amount of pressure drop through the filter.

In FIGS. 1 and 9, it is shown that the thin filter element 30 and filter blank 80 are sandwiched together so that air flowing through this composite filtering structure is first intercepted by conical element 30. This element removes the solid particles which have not been centrifuged out in canister 10. The air particles passing through filter blank 80 engage electrically charged fiber layers 70 which remove most of the air particles which penetrated layer 30. If employed, a gas filter receives the filtered air from filter blank 80 to remove fumes and other undesirable gases in the air. These gases are attracted by the activated carbon and do not pass upwardly through disc 60. Thus, improved vacuum cleaner A can be used for cleaning fine particles from a room and can help sterilize a room from pollen, bacteria, viruses, microorganisms and the like. By also using a gas filter, smoke and other unwanted gasses can also be removed from the air. It is appreciated that the vacuum cleaner can clean the ambient air for a normal household use.

As shown in FIGS. 1 and 9, the air passes upwardly from the cyclone action of canister 20 through exhaust 54 by passing the blank filter 80 positioned between conical filter cone 30 and flat filter disc, or secondary filter 60. FIG. 9 illustrates a novel method of processing air in a vacuum cleaner, which novel method has not been heretofore available, especially in canister type vacuum cleaners. This novel method allows the vacuum cleaner to be capable of removing ultrafine particles entrained within the air being cleaned.

Having thus defined the invention, the following is claimed:

1. A particle removing filter for removing particles from air passing through the filter, said filter comprising at least one layer of electrically charged fiber material substantially encapsulated between at least two layers of support material, said at least one layer of electrically charged fiber material and said at least two layers of support material connected together by at least two melted seams, said one melted seam positioned substantially at the peripheral edge along the entire periphery of said filter, said second melted seam positioned along the entire periphery of said filter and spaced inwardly from said one melted seam, said melted seams forming a substantially airtight barrier between said filter layers.

2. A filter as defined in claim 1, wherein said filter including a plurality of layers of electrically charged fiber material substantially encapsulated between at least two layers of support material and at least one layer of support material disposed between two layers of electrically charged fiber material.

3. A filter as defined in claim 1, wherein said filter including at least three layers of said electrically charged material fiber material.

4. A filter as defined in claim 2, wherein said filter includes at least three layers of said electrically charged material fiber material.

5. A filter as defined in claim 1, wherein said electrically charged fiber material is non-woven and includes a high molecular weight, non-polar material.

6. A filter as defined in claim 4, wherein said electrically charged fiber material is non-woven and includes a high molecular weight, non-polar material.

7. A filter is defined in claim 5, wherein said electrically charged fiber material includes polypropylene.

8. A filter as defined in claim 6, wherein said electrically charged fiber material includes polypropylene.

9. A filter as defined in claim 1, wherein said support material is substantially absent charged fibers and includes a material selected from the group consisting of polyester, cotton, nylon and mixtures thereof.

10. A filter as defined in claim 2, wherein said support material is substantially absent charged fibers and includes a material selected from the group consisting of polyester, cotton, nylon and mixtures thereof.

11. A filter as defined in claim 5, wherein said support material is substantially absent charged fibers and includes a material selected from the group consisting of polyester, cotton, nylon and mixtures thereof.

12. A filter as defined in claim 6, wherein said support material is substantially absent charged fibers and includes a material selected from the group consisting of polyester, cotton, nylon and mixtures thereof.

13. A filter as defined in claim 1, wherein said filter is substantially conical in shape.

14. A filter as defined in claim 11, wherein said filter is substantially conical in shape.

15. A filter as defined in claim 12, wherein said particle removing filter is substantially conical in shape.

16. A filter as defined in claim 1, wherein each layer of said charged fiber material has a weight of 60–150 gm/m$^2$.

17. A filter as defined in claim 14, wherein each layer of said charged fiber material has a weight of 60–150 gm/m$^2$.

18. A filter as defined in claim 15, wherein each layer of said charged fiber material has a weight of 60–150 gm/m$^2$.

19. A filter as defined in claim 1, wherein said thickness of each layer of said charged fiber material is substantially the same.

20. A filter as defined in claim 18, wherein said thickness of each layer of said charged fiber material is substantially the same.

21. A filter as defined in claim 1, wherein said melted seam formed by an ultra-sonic welder.

22. A filter as defined in claim 20, wherein said melted seam formed by an ultra-sonic welder.

23. A particle removing filter for removing a majority of particles which are 0.3 micron or larger from air passing through the filter, said filter substantially conical in shape and including at least one layer of electrically charged fiber material substantially encapsulated between at least two layers of support material, each layer of said electrically charged fiber material including non-woven polyproplyene fibers and having a weight of 60–150 gm/m$^2$ and an ASHRAE 51.1: Initial Atmospheric Dust Spot Efficiency at 40 ft/min of at least about 80, said support material including substantially non-electrically charged fibers and including a material selected from the group consisting of polyester, cotton, nylon and mixtures thereof, and said layers of said electrically charged fiber material and said support material connected together by at least one melted seam positioned substantially at the peripheral edge along the entire periphery of said filter, said melted seam forming a substantially airtight barrier between said filter layers.

24. A filter as defined in claim 23, wherein said filter including a plurality of layers of electrically charged fiber material substantially encapsulated between at least two layers of support material and at least one layer of support material disposed between two layers of electrically charged fiber material.

25. A filter as defined in claim 23, wherein said filter includes a second melted seam spaced inwardly from said at least one melted seam positioned substantially at said peripheral edge of said filter.

26. A filter as defined in claim 24, wherein said filter means includes a second melted seam spaced inwardly from said edge seam.

27. A filter as defined in claim 23, wherein said thickness of each layer of said charged fiber material is substantially the same.

28. A filter as defined in claim 25, wherein said thickness of each layer of said charged fiber material is substantially the same.

29. A filter as defined in claim 26, wherein said thickness of each layer of said charged fiber material is substantially the same.

30. A filter as defined in claim 23, wherein said filter includes at least three layers of said electrically charged fiber material.

31. A filter as defined in claim 29, wherein said filter includes at least three layers of said electrically charged fiber material.

32. A filter as defined in claim 23, wherein said melted seam formed by an ultra-sonic welder.

33. A filter as defined in claim 31, wherein said melted seam formed by an ultra-sonic welder.

* * * * *